United States Patent
Oh et al.

(10) Patent No.: US 9,704,063 B2
(45) Date of Patent: Jul. 11, 2017

(54) METHOD OF SAMPLING FEATURE POINTS, IMAGE MATCHING METHOD USING THE SAME, AND IMAGE MATCHING APPARATUS

(71) Applicant: HANWHA TECHWIN CO., LTD., Changwon-si (KR)

(72) Inventors: Jaeyoon Oh, Changwon-si (KR); Joonsung Lee, Changwon-si (KR); Jaewoo Park, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 87 days.

(21) Appl. No.: 14/583,909

(22) Filed: Dec. 29, 2014

(65) Prior Publication Data
US 2015/0199585 A1    Jul. 16, 2015

(30) Foreign Application Priority Data
Jan. 14, 2014    (KR) ........................ 10-2014-0004711

(51) Int. Cl.
*G06K 9/62*    (2006.01)

(52) U.S. Cl.
CPC ................... *G06K 9/6211* (2013.01)

(58) Field of Classification Search
CPC ..... G06T 7/0083; G06T 17/00; G06K 9/6203; G06K 9/6211
See application file for complete search history.

(56) References Cited

U.S. PATENT DOCUMENTS

| | | | |
|---|---|---|---|
| 2004/0047499 A1* | 3/2004 | Shams | G06T 7/0012 382/129 |
| 2005/0271276 A1* | 12/2005 | Liang | G06K 9/342 382/180 |

(Continued)

FOREIGN PATENT DOCUMENTS

| | | |
|---|---|---|
| JP | 2006-309455 A | 11/2006 |
| KR | 10-2005-0084448 A | 8/2005 |

(Continued)

OTHER PUBLICATIONS

Chol-Hee Jang et al.; "Constraint Satisfaction Problem"; CSP Driven RANSAC Algorithm for Improving Accuracy of Planar Homography; vol. 39; Nov. 2012; pp. 876-888.

(Continued)

*Primary Examiner* — Siamak Harandi
*Assistant Examiner* — Shaghayegh Azima
(74) *Attorney, Agent, or Firm* — Sughrue Mion, PLLC

(57) ABSTRACT

A method of sampling feature points, an image matching method using the same, and an image matching processor are disclosed. The method of sampling feature points for image matching includes: dividing a first image into a plurality of regions corresponding to a number of feature points to be sampled; extracting a sampled feature point from each of the regions such that a distance between a sampled feature point of one region and a sampled feature point of another region satisfies a predetermined condition; and estimating a homography on the basis of the extracted sampled feature points and corresponding sampled feature points of a second image to be matched with the first image.

18 Claims, 9 Drawing Sheets

(56) References Cited

U.S. PATENT DOCUMENTS

| | | | |
|---|---|---|---|
| 2006/0125920 A1* | 6/2006 | Criminisi | H04N 5/0733 348/159 |
| 2006/0251327 A1 | 11/2006 | Trajkovic et al. | |
| 2009/0041349 A1* | 2/2009 | Suzuki | G06T 7/44 382/168 |
| 2010/0061637 A1* | 3/2010 | Mochizuki | G06T 7/12 382/199 |
| 2011/0293142 A1* | 12/2011 | van der Mark | G06T 7/0028 382/103 |
| 2014/0037189 A1* | 2/2014 | Ziegler | G06T 17/00 382/154 |

FOREIGN PATENT DOCUMENTS

| | | |
|---|---|---|
| KR | 10-2012-0009590 A | 2/2012 |
| KR | 10-2012-0021666 A | 3/2012 |
| WO | 2012/011713 A2 | 1/2012 |

OTHER PUBLICATIONS

Baek Sop Kim et al.; "Hierarchical Feature Based Block Motion Estimation for Ultrasound Image Sequences"; vol. 33; Apr. 2006; pp. 402-410.

* cited by examiner

METHOD OF SAMPLING FEATURE POINTS, IMAGE MATCHING METHOD USING THE SAME, AND IMAGE MATCHING APPARATUS

CROSS-REFERENCE TO THE RELATED APPLICATION

This application claims priority from Korean Patent Application No. 10-2014-0004711, filed on Jan. 14, 2014, in the Korean Intellectual Property Office, the disclosure of which is incorporated herein in its entirety by reference.

BACKGROUND

1. Field

Methods and apparatuses consistent with exemplary embodiments relate to sampling feature points and image matching.

2. Description of the Related Art

Recently, research has been conducted in an area of fusing mutually complementary information using two or more sensors to improve accuracy and reliability of algorithms for change detection, motion detection, super-resolution image restoration, object recognition and tracking, and the like in the fields of a monitoring system, medical imaging, and the like.

In a system for generating one fusion image by acquiring two or more images in the monitoring system field, the medical image field, and the like, image matching (alignment) needs to be performed.

SUMMARY

Exemplary embodiments of the inventive concept include a random sampling method for addressing a problem occurring because a distribution of feature points is linear or is crowded in a specific region during a random sampling process for image matching and an image matching method using the same.

Various aspects of the inventive concept will be set forth in part in the description which follows and, in part, will be apparent from the description, or may be learned by practice of the presented embodiments.

According to one or more exemplary embodiments, there is provided a method of sampling feature points for image matching which may include: dividing a first image into a plurality of regions corresponding to a number of feature points to be sampled; extracting a sampled feature point from each of the regions such that a distance between a sampled feature point of one region and a sampled feature point of another region satisfies a predetermined condition; and estimating a homography on the basis of the extracted sampled feature points and corresponding sampled feature points of a second image to be matched with the first image.

The extracting of the one sampled feature point may include: extracting a first sampled feature point from among feature points in a first region; extracting a second sampled feature point from among feature points in a second region which are spaced apart by a first distance or more from the first sampled feature point; extracting a third sampled feature point from among feature points in a third region which are spaced apart by a second distance or more from the second sampled feature point; and extracting a fourth sampled feature point from among feature points in a fourth region which are spaced apart by a third distance or more from the third sampled feature point.

The extracting of the third sampled feature point may include extracting the third sampled feature point from among feature points in the third region which are spaced apart by the first distance or more from the first sampled feature point and spaced apart by the second distance or more from the second sampled feature point.

The extracting of the fourth sampled feature point may include extracting the fourth sampled feature point from among feature points in the fourth region, which are spaced apart by the first distance or more from the first sampled feature point, spaced apart by the second distance or more from the second sampled feature point, and spaced apart by the third distance or more from the third sampled feature point.

The first to third distances may be greater than distances from the first to third sampled feature points to the center point of the first image, respectively.

The first and second images may be acquired by a same image sensor or different image sensors.

According to one or more exemplary embodiments, there is provided an image matching method which may include: extracting a plurality of feature points from a first image and a second image to be matched with the first image; selecting at least one corresponding feature point pair from among the feature points of the first and second images; dividing the first image into a plurality of regions corresponding to a number of feature points to be sampled; extracting a sampled feature point from each of the regions of the first image such that a distance between a sampled feature point of one region and a sampled feature point of another region is satisfied; and estimating a homography on the basis of the extracted sampled feature points and corresponding sampled feature points of the second image.

According to one or more exemplary embodiments, there is provided an image matching apparatus which may include: a region divider configured to divide a first image into a plurality of regions corresponding to a number of feature points to be sampled; a sampled feature point extractor configured to extract a sampled feature point from each of the regions such that a distance between a sampled feature point of one region and a sampled feature point of another region satisfies a predetermined condition; and an estimator configured to estimate a homography on the basis of the extracted sampled feature points and corresponding sampled feature points of a second image to be matched with the first image.

The sampled feature point extractor may extract a first sampled feature point from among feature points in a first region, extract a second sampled feature point from among feature points in a second region, which are spaced apart by a first distance or more from the first sampled feature point, extract a third sampled feature point from among feature points in a third region, which are spaced apart by a second distance or more from the second sampled feature point, and extract a fourth sampled feature point from among feature points in a fourth region, which are spaced apart by a third distance or more from the third sampled feature point.

The sampled feature point extractor may extract the third sampled feature point from among feature points in the third region, which are spaced apart by the first distance or more from the first sampled feature point and spaced apart by the second distance or more from the second sampled feature point.

The sampled feature point extractor may extract the fourth sampled feature point from among feature points in the fourth region, which are spaced apart by the first distance or more from the first sampled feature point, spaced apart by the second distance or more from the second sampled feature point, and spaced apart by the third distance or more from the third sampled feature point.

The first to third distances may be greater than distances from the first to third sampled feature points to the center point of the first image, respectively.

The first and second images may be acquired by a same image sensor or different image sensors.

The image matching apparatus may further include: a feature point extractor configured to extract a plurality of feature points of the first and second images; and a feature point pair selector configured to select at least one corresponding feature point pair from among the feature points of the first and second images.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
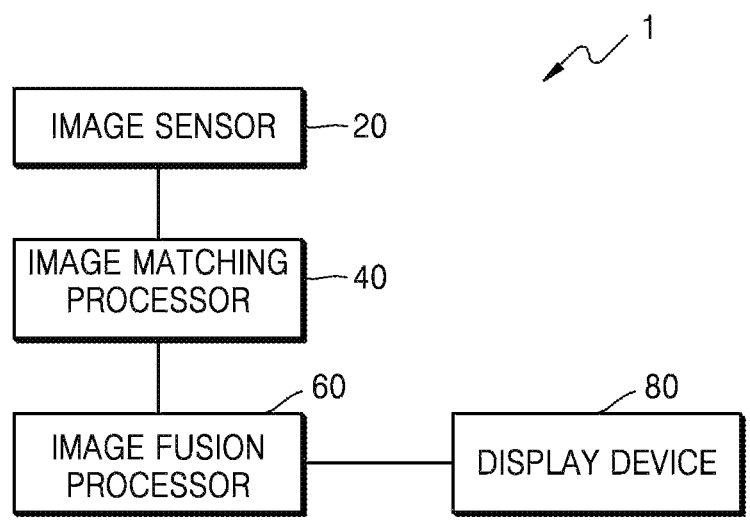
FIG. 1 is a block diagram of an image fusion system according to an exemplary embodiment.

Reference will now be made in detail to exemplary embodiments which are illustrated in the accompanying drawings, wherein like reference numerals refer to like elements throughout. In this regard, these embodiments may have different forms and should not be construed as being limited to the descriptions set forth herein. Accordingly, the exemplary embodiments are merely described below, by referring to the figures, to explain aspects of the inventive concept.

Although terms, such as 'first' and 'second', can be used to describe various elements, the elements cannot be limited by the terms. The terms can be used to classify a certain element from another element.

The terminology used in the embodiments below is used only to describe specific embodiments and does not have any intention to limit the inventive concept. An expression in the singular includes an expression in the plural unless they are clearly different from each other in context. In the embodiments below, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

The embodiments can be represented with functional blocks and various processing steps. These functional blocks can be implemented by various numbers of hardware and/or software configurations for executing specific functions. For example, the embodiments may adopt direct circuit configurations, such as memory, processing, logic, and look-up table, for executing various functions under control of one or more processors or by other control devices. Like components of the embodiments being able to execute the various functions with software programming or software elements, the embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the embodiments may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

As used herein, the term "and/or" includes any and all combinations of one or more of the associated listed items.

The inventive concept will now be described more fully with reference to the accompanying drawings, in which exemplary embodiments of the inventive concept are shown. Like reference numerals in the description and the drawings denote like elements, and thus their repetitive description will be omitted.

FIG. 1 is a block diagram of an image fusion system 1 according to an exemplary embodiment.

Referring to FIG. 1, the image fusion system 1 may include an image sensor 20, an image matching processor 40, an image fusion processor 60, and a display device 80.

The image sensor 20 may be a camera for photographing a scene and providing image information. The image sensor 20 may be one sensor for acquiring images of different points of view or different times. Alternatively, the image sensor 20 may include two or more sensors having different characteristics and configured to obtain different images. For example, the image sensor 20 may include a visible light camera and an infrared light camera (or a thermal image camera).

The image sensor 20 may have a pan, tilt, and zoom (PTZ) function. The image sensor 20 may be mounted as one body inside and outside offices, houses, hospitals, banks, public buildings requiring security, and the like, may be used for entrance management or crime prevention, and may have various shapes, such as a straight line shape, a dome shape, and the like, depending on a mounting place and a use purpose thereof.

The image matching processor 40 performs image matching for aligning two or more images in one coordinate system by matching a location relationship of the two or more images. The image matching processor 40 matches two images, i.e., a first image and a second image, captured by the image sensor 20. The first and second images may be acquired by a sensor at different points of view or different times or sensors having different characteristics.

The image matching processor 40 estimates a homography by randomly sampling feature points extracted from the first and second images. The homography is a matrix indicating a correspondence relationship between the feature points of the first and second images. The image matching processor 40 matches the first and second images by using the estimated homography.

The image fusion processor 60 performs signal processing for outputting a received image signal as a signal suitable for a display standard. The image fusion processor 60 fuses the matched first and second images.

The image fusion processor 60 may perform image signal processing for improving image quality on the first and second images, such as noise reduction, gamma correction, color filter array interpolation, color matrix, color correction, color enhancement, and the like. In addition, the image fusion processor 60 may generate an image file by compressing data of a fusion image after performing the image signal processing for improving image quality or restore image data from the image file. An image compression format may include a reversible format and an irreversible format.

In addition, the image fusion processor 60 may functionally perform color processing, blur processing, edge enhancement processing, image analysis processing, image recognition processing, image effect processing, and the like. The image recognition processing may include face recognition processing, scene recognition processing, and the like. Although FIG. 1 illustrates the image fusion processor 60 is separately disposed from the image matching processor 40, the image fusion processor 60 may be included in the image matching processor 40, according to an exemplary embodiment.

The display device 80 provides the fusion image output from the image fusion processor 60 to a user so that the user monitors a displayed image. The display device 80 may display the fusion image in which the first and second images overlap each other. The display device 80 may include a liquid crystal display (LCD) panel, an organic light-emitting display (OLED) panel, an electrophoretic display (EPD) panel, or the like. The display device 80 may include a touch screen via which a touch input by the user is received, such that the display device 80 operates as a user input interface.

Figure 2:
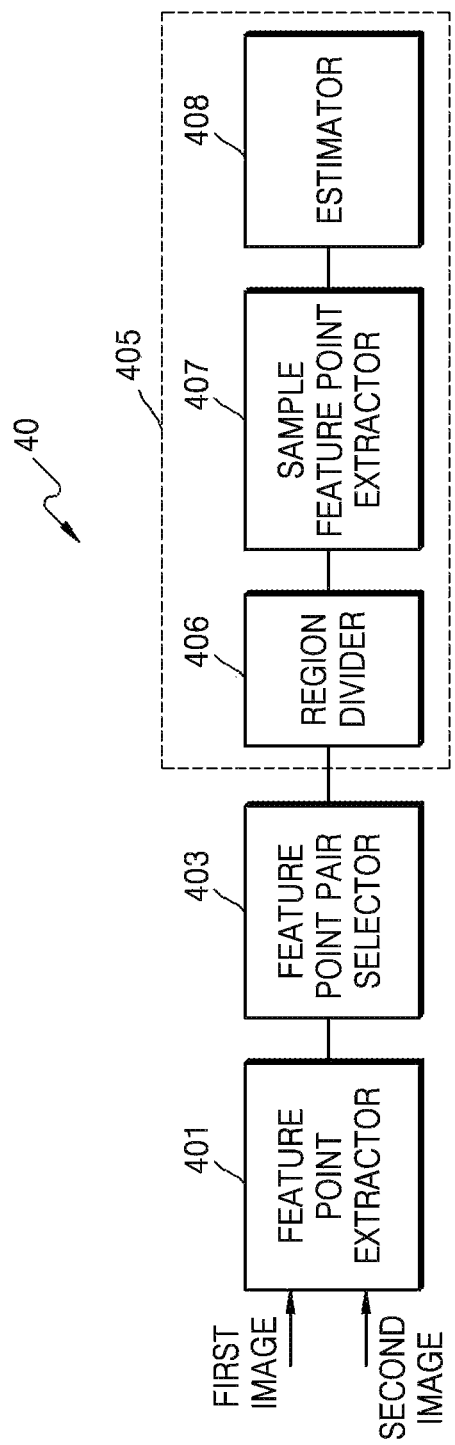
FIG. 2 is a block diagram of an image matching processor according to an exemplary embodiment.

FIG. 2 is a block diagram of the image matching processor 40 according to an exemplary embodiment.

Referring to FIG. 2, the image matching processor 40 may include a feature point extractor 401, a feature point pair selector 403, and a homography estimator 405.

The feature point extractor 401 may extract feature points of the first and second images. The feature point extractor 401 may detect the feature points of the first and second images sequentially or in parallel.

The feature point extractor 401 may extract corners, edges, contours, line intersections, and the like as feature points from each of the first and second images by using a scale invariant feature transform (SIFT) algorithm, a Harris corner algorithm, a smallest univalue segment assimilating nucleus (SUSAN) algorithm, or the like. However, a feature point extraction algorithm is not specifically limited thereto, and other feature point extraction algorithms may be used.

The feature point pair selector 403 may select corresponding feature points from the feature points of the first and second images. The feature point pair selector 403 may determine the first or second image as a reference image, and select a highly similar feature point as a corresponding feature point from the other image for each of the feature points of the reference image.

The homography estimator 405 may estimate a homography by using a random sample consensus (RANSAC) algorithm or a locally optimized RANSAC (LO-RANSAC) algorithm. The homography may include rotation information indicating a rotation angle, translation information indicating movement in x, y, and z directions, and scaling information indicating scaling amounts in the x, y, and z directions. However, the present embodiment is not limited thereto, and another algorithm by which a homography is estimated using random sampling may be used.

The RANSAC algorithm includes a random sampling operation of randomly selecting n feature point pairs for estimating a homography from among feature point pairs extracted and matched from a pair of images. Accordingly, when n feature points are sampled from among total N feature points (N≥n), the number of samplings is large as in Equation 1 below, and thus, the total algorithm processing speed is very slow.

$$\text{Number of samplings} = NCn = N!/n!(N-n)! \tag{1}$$

In addition, when the feature points selected in the random sampling operation of the RANSAC algorithm is linear or grouped in a specific region, an accurate homography cannot be estimated, and thus, the efficiency of the RANSAC algorithm may be degraded by estimating an unnecessary homography due to wrongly selected feature points.

In the present embodiment, by dividing a sampling region on the basis of the number n of feature points to be sampled and delimiting a distance between the feature points to be sampled, the number of samplings in the RANSAC algorithm may be reduced, and random samples may be uniformly acquired, and thus, the performance of a matching/fusion system may be dramatically improved.

The homography estimator 405 may include a region divider 406, a sample feature point extractor 407, and an estimator 408.

The region divider 406 may classify feature points of the reference image of the first and second images into regions corresponding to the number n of sampled feature points. Since four sampled feature points are used to estimate a two-dimensional homography, the region divider 406 may divide the reference image into four regions, i.e., first to fourth regions.

The sampled feature point extractor 407 may extract one sampled feature point from each region so that a distance limit condition that sampled feature points extracted from the regions are spaced apart from one another by a specific distance or more is satisfied. A method of extracting sampled feature points will be described below with reference to FIGS. 4A to 4K.

The estimator 408 may estimate a homography on the basis of sampled feature points extracted from the reference image and corresponding sampled feature points of the other image.

A random sampling method and an image matching method of the image matching processor 40 of FIG. 2 will now be described.

Figure 3:
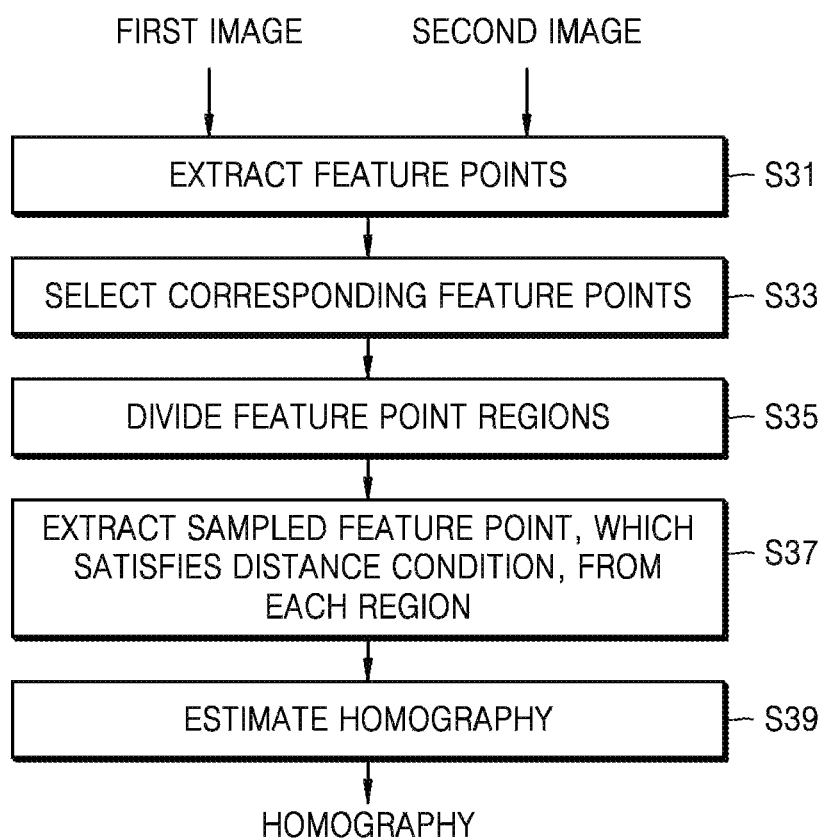
FIG. 3 is a flowchart of an image matching method according to an exemplary embodiment.

FIG. 3 is a flowchart of an image matching method according to an exemplary embodiment. FIGS. 4A to 4K illustrate a random sampling method in the image matching method of FIG. 3.

Referring to FIG. 3, in operation S31, the image matching processor 40 extracts feature points of the first and second images. The feature points may include corners, edges, contours, line intersections, and the like.

In operation S33, the image matching processor 40 selects corresponding feature points from the extracted feature points of the first and second images. The image matching processor 40 may select corresponding feature point pairs of the first and second images on the basis of similarity determination. For example, the image matching processor 40 may select feature points of the other image, which are most similar to feature points of a reference image of the first and second images, as corresponding feature points of the feature points of the reference image.

The image matching processor 40 may perform random sampling on the corresponding feature point pairs to estimate a homography.

In operation S35, the image matching processor 40 divides the reference image into regions corresponding to the number of feature points to be sampled. For example, the image matching processor 40 may divide the reference image into four regions, i.e., first to fourth regions, corresponding to four feature points to be sampled, which are used to estimate a two-dimensional homography.

Figure 4A:
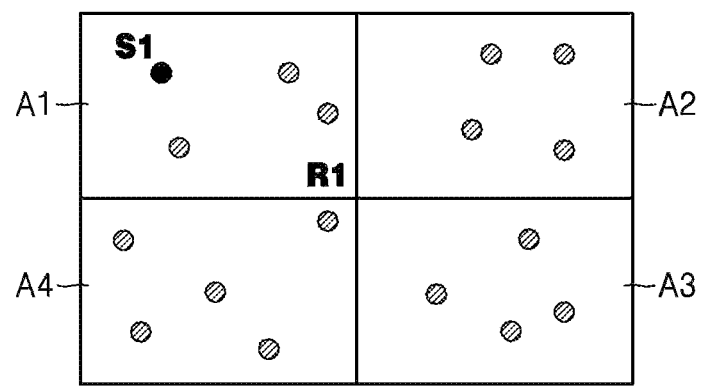
FIGS. 4A to 4K illustrate a random sampling method in the image matching method of FIG. 3.

Referring to FIG. 4A, the reference image may be evenly divided into a first region A1, a second region A2, a third region A3, and a fourth region A4 clockwise.

In operation S37, the image matching processor 40 extracts one sampled feature point from each region so that a distance limit condition that sampled feature points extracted from the regions are spaced apart from one another by a specific distance or more is satisfied.

The image matching processor 40 may extract a first sampled feature point from among feature points in one of the first to fourth regions of the reference image. Referring to FIG. 4A, the first region A1 is set as a first sampling region R1, and a first sampled feature point S1 is randomly extracted by performing random sampling in the first sampling region R1.

Figure 4B:
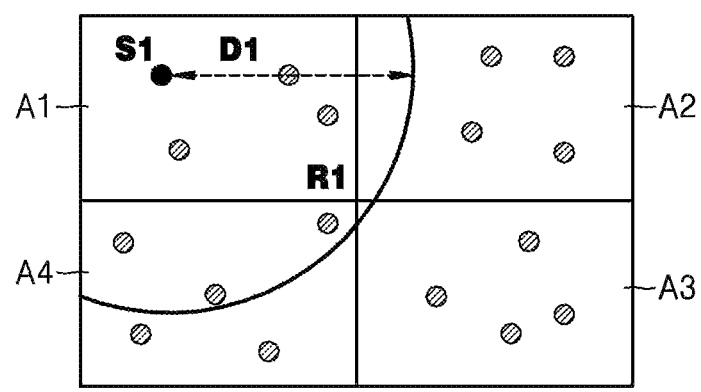
Figure 4C:
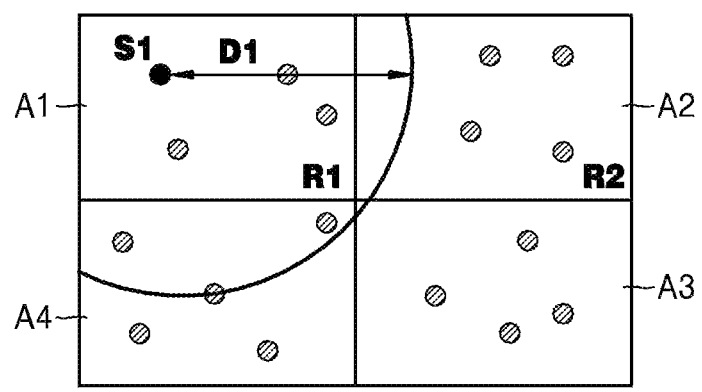
Figure 4D:
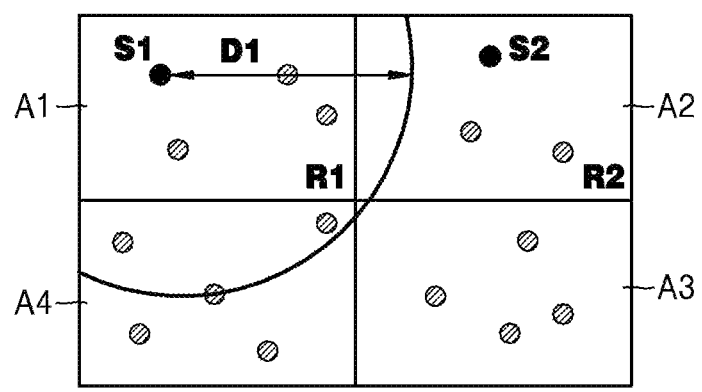

The image matching processor 40 may extract a second sampled feature point from among feature points in the second region A2, which are spaced apart by a first distance or more from the first sampled feature point S1. Referring to FIG. 4B, a first distance D1 farther than a distance from the first sampled feature point S1 to a center point of the reference image is set. The first distance D1 may be set as a constant times the distance from the first sampled feature point S1 to the center point of the reference image or a value obtained by adding a constant to the distance from the first sampled feature point S1 to the center point of the reference image. Referring to FIG. 4C, an intersection between a region farther than the first distance D1 from the first sampled feature point S1 and the second region A2 is set as a second sampling region R2. Referring to FIG. 4D, a second sampled feature point S2 is randomly extracted by performing random sampling in the second sampling region R2.

Figure 4E:
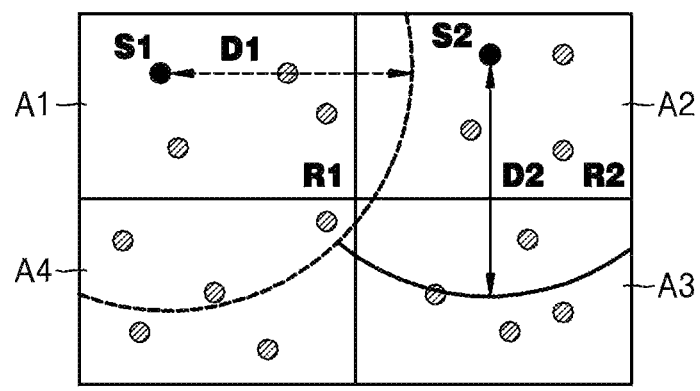
Figure 4F:
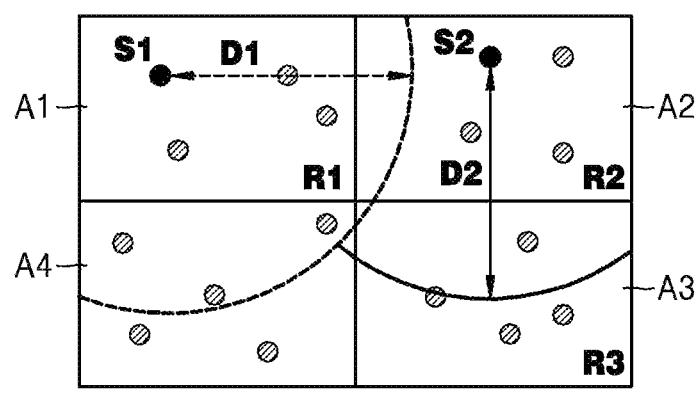
Figure 4G:
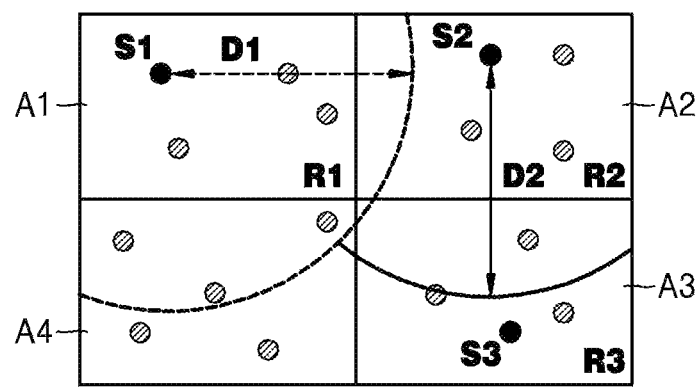

The image matching processor 40 may extract a third sampled feature point from among feature points in the third region, which are spaced apart by a second distance or more from the second sampled feature point S2. Referring to FIG. 4E, a second distance D2 farther than a distance from the second sampled feature point S2 to the center point of the reference image is set. The second distance D2 may be set as a constant times the distance from the second sampled feature point S2 to the center point of the reference image or a value obtained by adding a constant to the distance from the second sampled feature point S2 to the center point of the reference image. Referring to FIG. 4F, an intersection between a region farther than the second distance D2 from the second sampled feature point S2 and the third region A3 is set as a third sampling region R3. Referring to FIG. 4G, a third sampled feature point S3 is randomly extracted by performing random sampling in the third sampling region R3. Alternatively, the image matching processor 40 may set an intersection between the region farther than the first distance D1 from the first sampled feature point S1, the region farther than the second distance D2 from the second sampled feature point S2, and the third region A3 as the third sampling region R3.

Figure 4H:
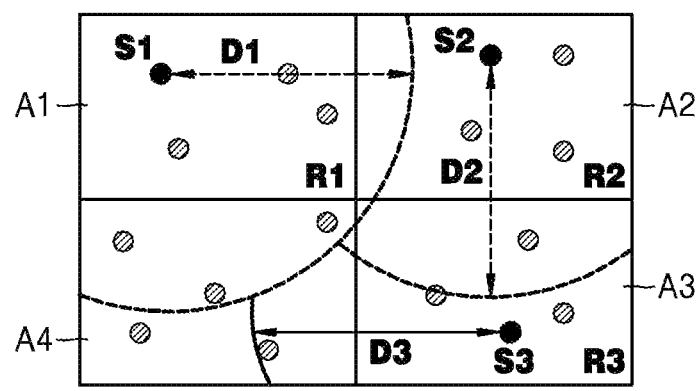
Figure 4I:
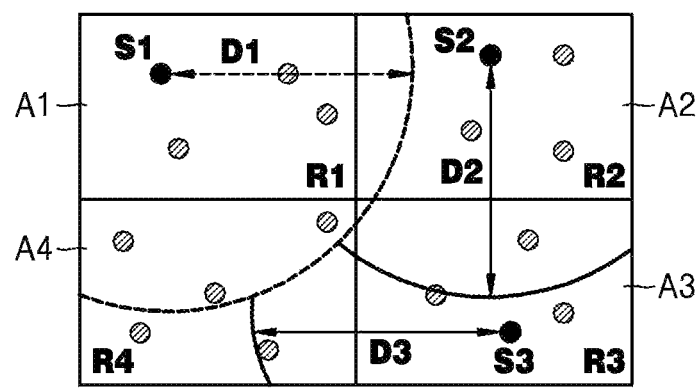
Figure 4J:
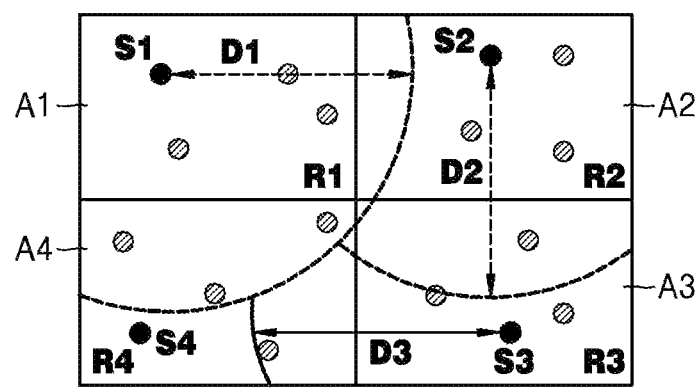

The image matching processor 40 may extract a fourth sampled feature point from among feature points in the fourth region A4, which are spaced by a third distance or more from the third sampled feature point S3. Referring to FIG. 4H, a third distance D3 farther than a distance from the third sampled feature point S3 to the center point of the reference image is set. The third distance D3 may be set as a constant times the distance from the third sampled feature point S3 to the center point of the reference image or a value obtained by adding a constant to the distance from the third sampled feature point S3 to the center point of the reference image. Referring to FIG. 4I, an intersection between a region farther than the third distance D3 from the third sampled feature point S3 and the fourth region A4 is set as a fourth sampling region R4. Referring to FIG. 4J, a fourth sampled feature point S4 is randomly extracted by performing random sampling in the fourth sampling region R4. Alternatively, the image matching processor 40 may set an intersection between the region farther than the first distance D1 from the first sampled feature point S1, the region farther than the second distance D2 from the second sampled feature point S2, the region farther than the third distance D3 from the third sampled feature point S3, and the fourth region A4 as the fourth sampling region R4.

Figure 4K:
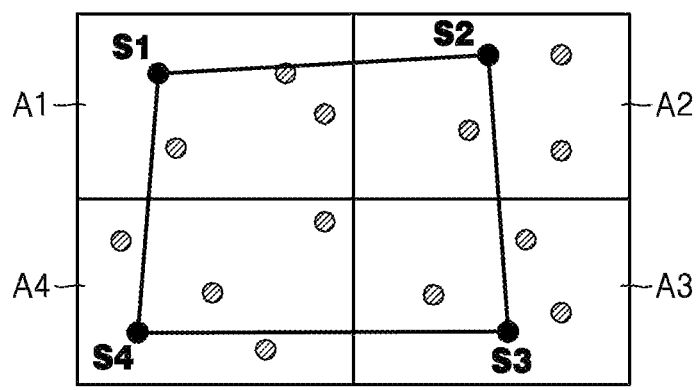

FIG. 4K shows the first, second, third, and fourth sampled feature point S1, S2, S3, and S4 selected according to the present embodiment. Referring to FIG. 4K, the first, second, third, and fourth sampled feature point S1, S2, S3, and S4 are selected without being linear or being grouped in a specific region.

In operation S39, the image matching processor 40 estimates a homography on the basis of the selected corresponding feature point pairs. The image matching processor 40 matches the first and second images by using the estimated homography.

According to the random sampling method for image matching according to the present embodiment, a problem occurring because a distribution of feature points is linear or is crowded in a specific region may be addressed, and the number of random samplings and inaccurate homography estimation may be reduced. Accordingly, image matching efficiency may be improved.

As described above, according to a random sampling method for image matching according to the one or more of the above exemplary embodiments, random samples may be uniformly acquired, and the number of random samplings and inaccurate homography estimation may be reduced.

In addition, other embodiments can also be implemented through computer-readable code/instructions in/on a medium, e.g., a computer-readable recording medium, to control at least one processing element to implement any above-described embodiment. The medium can correspond to any medium/media permitting the storage and/or transmission of the computer-readable code.

The image matching processor 40 and the image fusion processor 60 illustrated in FIG. 1, and at least one of the components, elements or units represented by a block as illustrated in FIG. 2 to constitute the image matching processor 40 may be embodied as various numbers of hardware, software and/or firmware structures that execute respective functions described above, according to an exemplary embodiment. For example, the image matching processor 40, the image fusion processor 60 and at least one of the components, elements or units of FIG. 2 may use a direct circuit structure, such as a memory, processing, logic, a look-up table, etc. that may execute the respective functions through controls of one or more microprocessors or other control apparatuses. Also, the image matching processor 40, the image fusion processor 60 and at least one of the components, elements or units of FIG. 2 may be specifically embodied by a module, a program, or a part of code, which contains one or more executable instructions for performing specified logic functions. Also, the image matching processor 40, the image fusion processor 60 and at least one of the components, elements or units of FIG. 2 may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The computer-readable code can be recorded/transferred on a medium in a variety of ways, with examples of the medium including recording media, such as magnetic storage media (e.g., read-only memory (ROM), floppy disks, hard disks, etc.) and optical recording media (e.g., compact disc (CD)-ROMs, or digital versatile disks (DVDs)), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of sampling feature points for image matching, the method comprising:
   dividing a first image into a plurality of regions corresponding to a number of feature points to be sampled;
   extracting a feature point from each of the regions such that a distance between an extracted feature point of one region and an extracted feature point of another region satisfies a predetermined condition; and
   estimating a homography based on extracted feature points of the first image and corresponding feature points of a second image to be matched with the first image,
   wherein the extracting comprises:
      extracting a first feature point from among feature points in a first region;
      extracting a second feature point from among feature points in a second region which are spaced apart by a first distance or more from the first feature point;
      extracting a third feature point from among feature points in a third region which are spaced apart by a second distance or more from the second feature point; and
      extracting a fourth feature point from among feature points in a fourth region which are spaced apart by a third distance or more from the third feature point.

2. The method of claim 1, wherein, in the extracting the feature point from each of the regions, the feature point of the other region is extracted after the feature point of the one region is extracted.

3. The method of claim 1, wherein the extracting the third feature point comprises extracting the third feature point from among feature points in the third region which are spaced apart by the first distance or more from the first feature point and spaced apart by the second distance or more from the second feature point.

4. The method of claim 1, wherein the extracting the fourth feature point comprises extracting the fourth feature point from among feature points in the fourth region, which are spaced apart by the first distance or more from the first feature point, spaced apart by the second distance or more from the second feature point, and spaced apart by the third distance or more from the third feature point.

5. The method of claim 1, wherein the first to third distances are greater than distances from the first to third feature points to a center point of the first image, respectively.

6. The method of claim 1, wherein the first and second images are acquired by a same image sensor or different image sensors.

7. The method of claim 6, wherein if the first and second images are acquired by the same image sensor, the first and second images are images of a same object captured from different points of view or captured at different times, and
   wherein if the first and second images are acquired by different image sensors, the different image sensors have different characteristics and are configured to capture different images of the same object.

8. The image matching method of claim 1 further comprises:
   matching the first and second images using the estimated homography; and
   fusing the first and second images to generate a fusion image.

9. An image matching method comprising:
   extracting a plurality of feature points from a first image and a second image to be matched with the first image;
   selecting at least one corresponding feature point pair from among the feature points of the first and second images;
   dividing the first image into a plurality of regions corresponding to a number of feature points to be sampled;
   sampling a feature point from each of the regions of the first image such that a distance between a sampled feature point of one region and a sampled feature point of another region satisfy a predetermined condition; and
   estimating a homography based on sampled feature points of the first image and corresponding feature points of the second image
   wherein the sampling comprises:
      selecting a first feature point from among feature points in a first region;
      selecting a second feature point from among feature points in a second region which are spaced apart by a first distance or more from the first feature point;
      selecting a third feature point from among feature points in a third region which are spaced apart by a second distance or more from the second feature point; and selecting a fourth feature point from among feature points in a fourth region which are spaced apart by a third distance or more from the third feature point.

10. An image matching processor comprising:
a region divider configured to divide a first image into a plurality of regions corresponding to a number of feature points to be sampled;
a feature point extractor configured to extract a feature point from each of the regions such that a distance between an extracted feature point of one region and an extracted feature point of another region satisfies a predetermined condition; and
an estimator configured to estimate a homography based on extracted feature points of the first image and corresponding feature points of a second image to be matched with the first image,
wherein the feature point extractor is further configured to extract a first feature point from among feature points in a first region, extract a second feature point from among feature points in a second region which are spaced apart by a first distance or more from the first feature point, extract a third feature point from among feature points in a third region which are spaced apart by a second distance or more from the second feature point, and extract a fourth feature point from among feature points in a fourth region which are spaced apart by a third distance or more from the third feature point.

11. The image matching processor of claim 10, wherein the feature point extractor is configured to extract the feature point of the other region after extracting the feature point of the one region.

12. The image matching processor of claim 10, wherein the feature point extractor configured to extract the third feature point from among feature points in the third region which are spaced apart by the first distance or more from the first feature point and spaced apart by the second distance or more from the second feature point.

13. The image matching processor of claim 10, wherein the feature point extractor configured to extract the fourth feature point from among feature points in the fourth region which are spaced apart by the first distance or more from the first feature point, spaced apart by the second distance or more from the second feature point, and spaced apart by the third distance or more from the third feature point.

14. The image matching processor of claim 10, wherein the first to third distances are greater than distances from the first to third feature points to a center point of the first image, respectively.

15. The image matching processor of claim 10, wherein the first and second images are acquired by a same image sensor or different image sensors.

16. The method of claim 15, wherein if the first and second images are acquired by the same image sensor, the first and second images are images of a same object captured from different points of view or captured at different times, and
wherein if the first and second images are acquired by different image sensors, the different image sensors have different characteristics and are configured to capture different images of the same object.

17. The image matching processor of claim 10, further comprising:
a feature point extractor configured to extract a plurality of feature points of the first and second images; and
a feature point pair selector configured to select at least one corresponding feature point pair from among the feature points of the first and second images.

18. The image matching processor of claim 10, further comprising an image fusion processor configured to fuse the first and second images to generate a fusion image by using the estimated homography.

* * * * *